3,192,475
BRIDGE APPARATUS FOR MEASURING THE ELECTRICAL ANGLE OF A ROTATING TRANSFORMER AND INCLUDING DIAGONAL BRANCH NULLING MEANS
Edgar Rice, Wayne, and Stanley Handelman, Emerson, N.J., assignors to Theta Instrument Corporation, East Paterson, N.J.
Filed Mar. 7, 1960, Ser. No. 13,214
11 Claims. (Cl. 324—158)

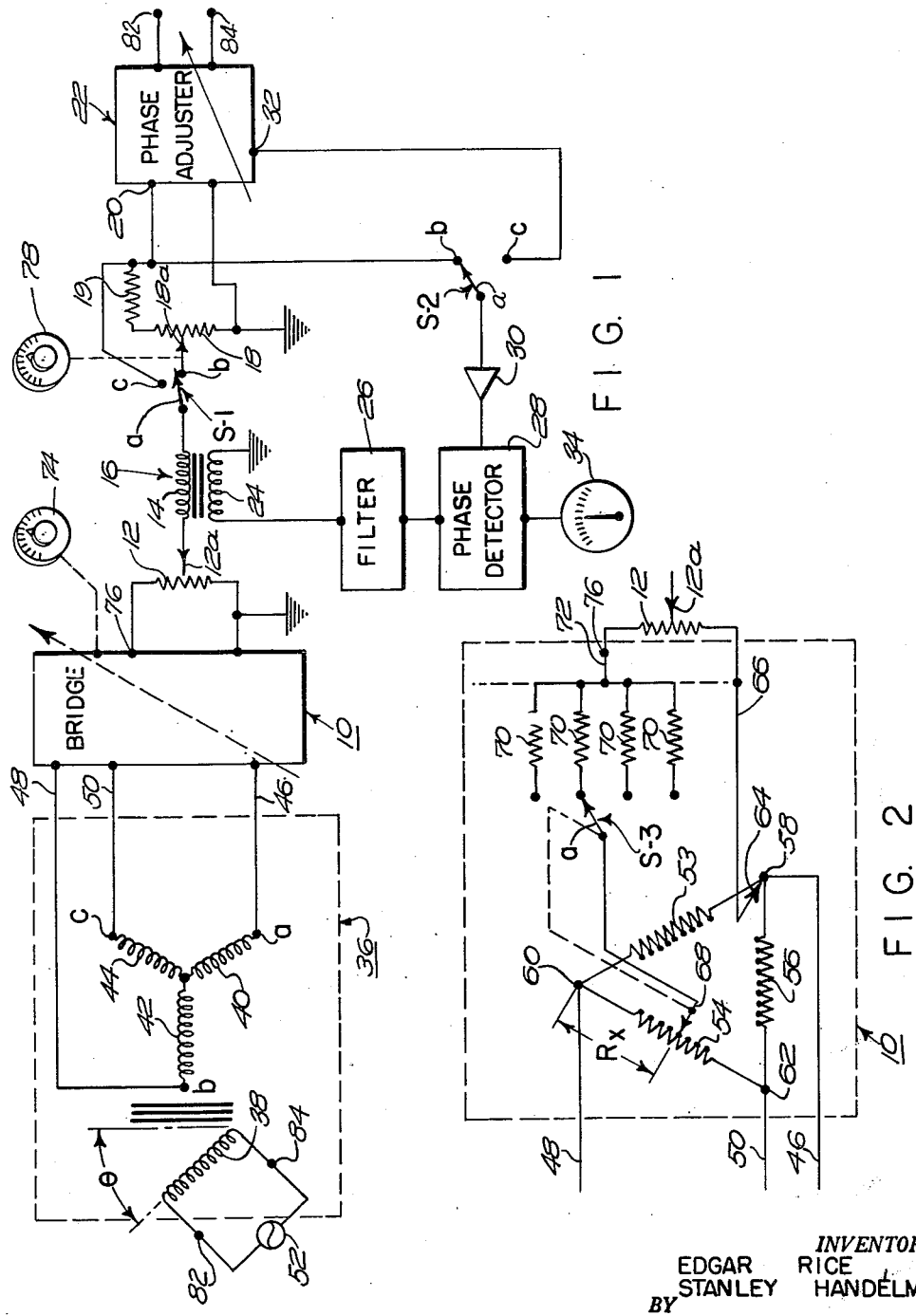
INVENTORS
EDGAR RICE
STANLEY HANDELMAN
BY
*Blair, Spencer & Buckles*
ATTORNEYS

This invention relates to a position indicator capable of accurately measuring the angular position of the rotor of a synchro or resolver. More particularly, it relates to a novel system in which the output voltage of a synchro or resolver is applied to a calibrated bridge circuit and the output voltage of the bridge is nulled against a variable reference.

Our invention is generally directed to the measurement of electrical rotor angles of rotating transformers known as synchros and resolvers. A device of this type includes a rotor and a stator, each of which carries a set of one or more windings. The axes of all the winding generally lies in a plane perpendicular to the rotor axis, and the windings in each set are oriented at different angles from each other with respect to the direction of shaft rotation. In a synchro, one or both of the winding sets include three windings making successive angles of 120° with each other and connected schematically in a Y configuration. A resolver, as the term is generally used, has two windings oriented at right angles to each other in one of the sets and one or two windings in the other set. A pair of compensation windings may also be included.

If a rotor winding is externally excited, the voltage induced in each stator winding depends on the angle of the rotor and varies from a maximum when the rotor winding is parallel to the stator winding (maximum coupling), to a minimum of zero when the two windings are perpendicular to each other. Since the stator windings all have different orientations with respect to the rotor, the voltages induced in them will ordinarily be different, and the differences between the voltages vary according to the shaft angle. In fact, the relative induced voltages are uniquely determined by the shaft position, as are the relative voltages between the terminals of successive stator windings.

An important use of synchros and resolvers is the remote indication of the angular position of a rotating object. The shaft of one unit, called a transmitter, is mechanically coupled to the rotating object, and the shaft of the other unit, operating as a motor, may be connected to an indicating device such as a pointer or the deflection coils of a cathode ray oscilloscope. It may also be connected to the input of a servo system controlling the position of the indicator. The rotor windings of the two units are excited from a common power source, and the stator windings are connected in parallel. If the rotors of both the transmitter and rotor units are in identical positions with respect to the stators, the voltages induced in the stator windings by transformer action will be identical, and there will be no circulating current. However, if one is displaced, the induced voltages are no longer the same in magnitude, and there will be a consequent circulation of current. This will produce a torque in the undisplaced rotor, causing it to rotate until the voltages are again the same and the rotors occupy identical positions with respect to their stators. Thus, as the rotor of the transmitter unit is displaced, the rotor of the motor unit follows it, and the visual indicator connected to the motor shaft shows the angular position of the transmitter shaft and the rotating object connected thereto.

In a similar application, the units may be used to indicate the output of a condition-sensing transducer adapted to measure pressure, temperature, etc. The transducer is made to rotate the shaft of a transmitter unit in response to changes in the measured parameter, and the position of the following motor shaft is an indication of this value.

Rotating transformers also are used in analog computers to generate trigonometric functions. If a quantity is represented by the voltage across the primary of the transformer, the voltage across a secondary winding will represent the quantity multiplied by the cosine of the angle between the secondary and primary windings. The generation of error signals in servo systems is another function of these transformers. They are known as control transformers in this application; the stator windings are connected to the stator of a transmitting unit, and the rotor voltage is amplified and used to power a motor which rotates the transformer shaft to reduce the rotor voltage to zero.

Various accuracy and calibration tests must be performed on rotating transformers and other units connected thereto. For example, after the manufacture of a synchro or resolver, the unit should be checked to determine whether the relative voltages at the output terminals vary, within tolerance requirements, in conformance with the theoretical variations as the shaft is rotated. Another instance is a check on an indicator which processes the output voltages of a transmitter unit and thereby indicates the position of its shaft. The electrical angle of the shaft may be measured by the same type of device used in the manufacturing check and the output indication of this device compared with the output of the indicator to be checked. A similar case is that of a transducer in which the calibration of the sensing device-transformer combination is checked by applying known input values to the transducer and checking the electrical angle of the transformer. A check of this kind is necessary where the shaft of the unit is inaccessible for direct measurement of its position.

One widely used system for checking electrical angles comprises a servomechanism arrangement using a control transformer or resolver whose inputs are the voltages representing the electrical angle to be measured. The servo loop is connected to adjust the shaft of the transformer to minimize the output voltage therefrom, as described above, and when a null is reached, this angle is equal to the electrical angle represented by the input voltages. A serious drawback to an instrument of this type is that the device being monitored is impedance loaded by the control transformer, and its characteristics are thereby changed. Furthermore, the control transformer, which is a rotating transformer itself, must be more accurate than the measurements made by it. As a result, an accuracy of better than one or two minutes of arc is completely impractical, whereas accuracies on the order of 20 seconds or better are often highly desirable.

Another prior measuring device is a system for synthesizing a set of voltages equal to the output voltages of the synchro or resolver under measurement. The synthesized voltages are compared with the measured voltages in nulling circuits, and the readings on various control dials indicate the transformer voltages, from which computations may be made to determine the electrical angle. The computations are quite laborious, particularly when a number of measurements are to be made. The system also fails in accuracy. An arc of 10 seconds is less than ten millionths of a complete circle. The corresponding increments range down to one part per million. Such accuracy is not provided in the required synthesizing and nulling circuits.

Accordingly, it is a principal object of our invention to provide an improved electrical angle measuring system capable of accurate measurement of the electrical angles of synchros and resolvers and other like devices.

Another object of our invention is to provide an instrument of the above character with an accuracy of measurement of 20 seconds of arc or better.

Another object of our invention is to provide an electrical angle measuring instrument of the above type in which measuring operations may be accomplished quickly and efficiently by relatively unskilled personnel.

A further object of our invention is to provide an instrument of the above type which may be constructed at a considerably lower cost than other instruments having comparable accuracy.

Other objects of our invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawing, in which:

FIGURE 1 is a schematic diagram of an electrical angle measuring instrument incorporating the principles of our invention, and FIGURE 2 is a detailed schematic diagram of the bridge incorporated in the circuit of FIGURE 1.

In general, our invention makes use of a bridge circuit connected to the output of the synchro or resolver under study and a calibrated voltage source, whose output is compared in a nulling arrangement with the output of the bridge. The bridge is adjustable in discrete increments corresponding to equal divisions of a full circle of rotation. It provides a null whenever the position of the shaft of the unit connected to it corresponds to the electrical position of the incremental bridge adjustment. The maximum value of the calibrated voltage compared with the output voltage of the bridge is exactly equal to the increment in the bridge output voltage between successive positions of the bridge adjustment adjacent the null position.

Thus, coarse adjustment of the instrument is made by setting the bridge to a position corresponding to an angle close to the angle of the synchro or resolver under test. The output voltage of the bridge, corresponding to the difference between the measured angle and the incremental bridge position, is then balanced by voltage from the calibrated source to provide a fine adjustment.

More particularly, the calibrated voltage source comprises a precision potentiometer excited by a standard voltage. The position of this potentiometer, when a null with the bridge output voltage is obtained, corresponds to the above difference in angles, and therefore the angle to be measured is the sum of the angle to which the bridge is set and the angle corresponding to the potentiometer position. The instrument is capable of highly accurate measurements even without accurate knowledge of the potentiometer exciting voltage. In fact, this voltage need not be known at all. It is compensated for during calibration of the instrument in a nulling procedure described below.

Turning now to FIGURE 1, our angle measuring instrument includes a bridge generally indicated at 10 whose output is connected to a calibration potentiometer 12. The wiper 12a of this potentiometer is connected to one terminal of the primary winding 14 of a transformer generally indicated at 16. The other terminal of the winding 14 is connected to the movable contact S1a of a switch S1. The switch S1 has a contact S1b connected to the wiper 18a of an interpolation potentiometer 18 and a contact S1c connected to a resistor 19 in series with the potentiometer. The potentiometer 18 and resistor 19 are connected to an output 20 of a phase adjuster generally indicated at 22.

The secondary 24 of the transformer 16 is coupled through a low pass filter 26 to one input of a phase detector 28. The other input of the detector 28 is from an isolation amplifier 30 which derives its input signal from the movable contact S2a of a two position switch S2. The switch S2 has a fixed contact S2b connected to the output 20 of the phase adjuster 22 and a contact S2c connected to an output 32 thereof. The voltages at the outputs 20 and 32 are 90° out of phase with each other.

Still referring to FIGURE 1, the output voltage of the phase detector 28 is measured by a zero center meter 34. The phase detector 28, which may be of the type described by F. E. Terman on page 1010 of Electronic and Radio Engineering, McGraw-Hill, (1955), operates as a quadrature rejecter. That is, the average output voltage thereof is zero when the two input voltages have a 90° phase relationship with each other. There is an output voltage of one polarity when the input voltages have the same phase and of the opposite polarity when they are in phase opposition. Thus, the direction of the deflection of the meter 34 indicates whether the two input voltages to the detector 28 have components of the same or opposite phase. The amount of deflection of the meter is roughly proportional to the sum of the in-phase or opposite phase components, as the case may be, of the input voltages of the detector 28.

The following portion of this description is made with reference to the measurement of the electrical angle of a synchro. It will be understood that the circuit operates in the same manner for measurement of resolver angles, the only difference being in the construction of the bridge 10, as discussed below.

Accordingly, as seen in FIGURE 1, a synchro generally indicated at 36 is connected to the input terminals of the bridge 10. The synchro 36 is provided with a rotor winding 38 and stator windings 40, 42 and 44. The stator windings are connected to the bridge 10 by leads 46, 48 and 50. If the winding 38 is excited from a suitable A.-C. source, as indicated at 52, the voltages between the output terminals of the stator will be $$E_{ac} = Ek \sin \theta \quad (1a)$$
$$E_{cb} = Ek \sin (\theta + 120°) \quad (1b)$$
and
$$E_{ba} = Ek \sin (\theta + 240°) \quad (1c)$$

where $k$ is a constant related to the rotor-stator turns ratio,
$\theta$ is the angle of rotation of the rotor winding 38, as indicated in FIGURE 1, and
$a$, $b$ and $c$ designate the terminals of the respective stator windings.

Referring to FIGURE 2, for synchro measurements the bridge 10 preferably includes three tapped resistors 53, 54 and 56 connected to the lines 46, 48 and 50 at junctions 58, 60 and 62. A movable contact 64 is part of a switch whose fixed contacts are the junctions 58, 60 and 62. The contact 64 is connected to a lead 66 which is one of the output terminals of the bridge. A movable contact 68, which is part of a switch comprising the taps on the resistors 53, 54 and 56, is connected to a movable contact S3a of a switch generally indicated at S3. The fixed contacts of the switch S3 are connected to resistors 70, the other ends of which are terminated at a lead 72. The lead 72 is the other output lead of the bridge 10. The contacts 68 and S3a are preferably ganged to provide automatic interpolation compensation in a manner to be described.

More specifically, with the positions of the contacts 64 and 68 as illustrated in FIGURE 2, the bridge 10 is arranged for measurements of the angle $\theta$ between 240° and 300°. It can be shown that a bridge null will be obtained, i.e., the bridge output voltage will be 0, whenever the ratio of the tapped resistance $R_x$ to the total resistance $R_{54}$ of the resistor 54 meets the requirement that, $$\frac{R_x}{R_{54}} = \frac{1}{2}(1 - \sqrt{3} \cot (\theta + 60°)) \quad (2)$$

Illustratively, the bridge resistors are tapped at points corresponding to 5° increments of rotation of the rotor winding 38 (FIGURE 1). Thus, the resistor 54 will have 11 taps intermediate the junctions 60 and 62, and the resistors 53 and 56 will be similarly tapped. The increments of resistance covered by the contact 68 as it moves along the resistor 54 are governed by Equation 2.

In order to measure $\theta$ in the range 60° to 120°, the contact 68 will traverse the resistor 56, with the contact 64 positioned at the junction 60. For angles between 120° and 180°, the contact 68 will move along the resistor 53, and the contact 64 will be at the junction 62. For the angles 180° to 360°, the resistors are again traversed in the manner described above, except that the contact 68 and junction 64 are reversed from their described positions in the 0° to 180° range. Preferably, the contacts 68 and 64 are mechanically linked to provide movement of the contact 64 each time the contact 68 traverses one of the bridge resistors. Thus, they may be operated by a single dial 74 (FIGURE 1) marked off in the 5° switching increments of the bridge 10. Alternatively, the contact 68 might be limited to movement along the resistor 54 and the three 120° intervals of shaft rotation covered by switching the leads 46, 48 and 50 among the junctions 58, 60 and 62. In this case, the lead 66 of the bridge would be permanently connected to the junction 58.

Obviously, the angular position of the rotor 38 (FIGURE 1) will seldom conform exactly to one of the 5° incremental null positions of the bridge 10 (FIGURE 2). Thus, while the bridge output voltage can be reduced to a minimum by rotation of the dial 74, it cannot, in general, be exactly nulled. However, the output voltage of the bridge, when minimized by manipulation of the dial 74, is almost exactly proportional to the increment of the angle $\theta$ in the interval between two 5° steps of the bridge 60 bracketing $\theta$.

For example, assume that $\theta$ lies between the X° and (X+5)° steps of the bridge 10, and the bridge is set at the X° position. If $\theta$ were equal to X, then the bridge output voltage would be 0. If $\theta$ were equal to (X+5), the output voltage would have a value which may be designated $E_0$. Then, to a very close approximation.

$$\frac{E_1}{E_0} = \frac{Y}{5°} \quad (3)$$

where $E_1$ is the bridge output voltage corresponding to the angle $\theta$ of the winding 38 (FIGURE 1), and $Y = \theta - X$.

Thus, $$\theta = X + \frac{E_1}{E_0} 5° \quad (4)$$

Accordingly, if $E_0$ is known, $\theta$ can be ascertained by comparing it to $E_1$, as indicated in Equation 1, and adding the result to the reading on the dial 74. However, $E_0$ varies from step to step of the bridge 10, thereby making it impractical to ascertain the quantity Y through measurement of the voltage between the contacts 64 and 68. The resistors 70 overcome this problem by standardizing the voltage at the upper terminal 76 of the potentiometer 12.

More specifically, as seen in FIGURE 2, each resistor 70, when connected into the circuit by the switch S3, forms a potentiometer with the fixed resistor of the potentiometer 12 across the contacts 64 and 68 of the bridge 10.

Through the ganging of the movable contacts 68 and S3a, each of the resistors 70 is connected when a given tap on the resistor 54 is contacted. The values of the individual resistors 70 are chosen so that the voltage $E_{076}$ at the terminal 76 is the same no matter which of the bridge taps is connected to the output. Thus, in cases where $E_0$ is relatively large, a resistor 70 having a relatively high resistance will be connected between the contact 68 and the terminal 76, thereby applying a relatively small proportion of the contacts 68–64 voltage across the potentiometer 12. At steps where $E_0$ is relatively small, the resistor 70 connected into the circuit has a relatively small resistance, so that a large proportion of the voltage appears across the potentiometer 12. Thus, the same voltage $E_{176}$ corresponds to the increment Y regardless of the setting of the bridge 10. It should also be noted that for a given setting of the wiper 12a, a given value of Y will always result in the same voltage at the output of the potentiometer 12, regardless of the bridge setting.

Returning to FIGURE 1, the voltage at the wiper 12a is measured and the value of Y ascertained by nulling this voltage against the output of the calibrated potentiometer 18. Thus, the dial 78, connected to the wiper 18a, may be marked off in subdivisions of the increment between the steps of the bridge 10. The angle of rotation of the winding 38 is then given by the sum of the readings on the dials 74 and 78.

More particularly, after the synchro 36 has been connected to the bridge 10 and the voltage source 52, the voltage across the potentiometer 18 is made equal to the 5° increment voltage $E_{012a}$ at the wiper 12a by means of one of the calibration procedures described below. Next, the dial 78 is set to 0, thereby grounding the wiper 18a, and the dial 74 is turned downwardly, i.e., in the direction of decreasing angle, until the meter 34 passes a null corresponding to the position of the winding 38.

It should be noted at this point that there will be two nulls close to bridge positions 180° apart. If the approximate angle of the winding 38 is known, the selection of the correct null is easily accomplished by inspection of the dial 74. If the approximate position is not known, but the setting of the phase adjuster 22 is correct within ±89, the correct one of the two opposite positions of the bridge 10 may be ascertained by noting the direction of the movement of the pointer of the meter 34 as the bridge passes through the null position on rotation of the dial 74. At one of the positions, the pointer will move from right to left, and in the other, from left to right. The direction depends upon the polarity of the input connections of the phase detector 28. Knowledge of the approximate correct setting of the phase adjuster will be facilitated by supplying its input terminals 82 and 84 from the source 52. Use of a single source also prevents variations in the relative phases of the voltages applied to the two ends of the winding 14 and the measuring errors which would result from such variations.

Still referring to FIGURE 1, once the dial 74 has been set in the above manner to the position immediately below the angle of the winding 38, the dial 78 is turned to move the wiper 18a upwardly from the ground connection to a point where a null is indicated by the meter 34. At this point, the voltage at the wiper 18a is equal to the voltage at the wiper 12a, the latter being proportional to the incremental angle Y, as noted above. The dial 78 indicates the proportion of the total resistance of the potentiometer 18 between the wiper 18a and ground; this proportion is equal to the ratio of the voltage at the wiper 18a to the total voltage across this potentiometer. Since the potentiometer voltage is equal to a full 5° incremental voltage at the wiper 12a, the position of the dial 78 indicates the ratio of the quantity Y to the 5° interval of the bridge 10. As pointed out above, the dial is actually scaled in degrees (from 0 to 5), and thus the sum of readings of the dials 74 and 78 is the angle $\theta$ of the rotor winding 38.

If the shaft of the synchro 36 is accessible, the instrument may be calibrated as follows. First, the dial 78 is set at 0, and then the synchro shaft is rotated until the meter 34 approaches zero from the proper direction, as described above. Next, the dial 78 is set at 5°, and the dial 74 is advanced up one 5° step. At this point, the switch S2 is thrown to the "c" position to apply quadrature voltage from the output 32 of the phase adjuster 22 to the amplifier 30 and phase detector 28. The phase adjuster is adjusted to provide a null in the meter 34, at which point the voltage at the output 32 will be exactly 90° out of phase with the voltage at the wiper 12a, and the voltage at the output 20 will be exactly in phase with it.

The switch S2 is then moved back to the "b" position, and the wiper 12a adjusted to once again provide a null indication in the meter 34. At this point, the voltage across the potentiometer 18 is exactly equal to and in phase with the voltage at the wiper 12a. As pointed out above, the latter voltage is the quantity $E_{0_{12a}}$, the 5° incremental voltage of the bridge 10.

In some cases, the shaft of the synchro 36 may be inaccessible, thereby ruling out the calibration procedure outlined above. An example of such a case is a packaged transducer in which the only connections available are for the quantities to be measured and the electrical output of the synchro incorporated therein. The first step in the calibration of the instrument is to set the dial 78 to 0 and obtain an approximate bridge null with the dial 74 in the manner outlined above. Next, the dial 74 is set back 90° from the approximate null position. The output voltage of the bridge 10 is at a maximum when the bridge setting is 90° from the electrical angle of the synchro 36. This will be apparent from the fact that, as pointed out above, nulls occur at both the position corresponding to the synchro angle and the position 180° therefrom. At the maximum output voltage position, the slope of the bridge voltage-versus-bridge position curve is zero, and, since the maximum is a fairly broad one, the slope does not vary appreciably from zero over a range of several degrees from the absolute maximum. Thus, at the position to which the bridge has been set, the voltage be considered to be exactly the 90° error voltage, even though the position may be 2° to 3° from an exact 90° error position.

At this point, the switch S1 is moved to the "c" position, and a null is obtained in the manner described above. The voltage across the combination of the potentiometer 18 and resistor 19 is then equal to the 90° error voltage appearing between the wiper 12a and ground. The relative values of the resistance of the potentiometer 18, and the sum of the resistances of the potentiometer 18 and the resistor 19 are in the same ratio as the 5° error voltage of the bridge 10 to the 90° error voltage thereof, i.e. sin 5°:1. Accordingly, the voltage across the potentiometer 18 is equal to the 5° error voltage of the bridge. The instrument is thus in calibration and ready for use after returning the switch S1 to the "b" position.

Thus, we have described a novel electrical angle measuring instrument adapted to measure the electrical angles of rotating transformers such as synchros and resolvers. The instrument incorporates a discretely adjustable bridge circuit whose output voltage represents the angular difference between the bridge position and the electrical position of the transformer under test. The bridge output voltage is nulled against a calibrated reference voltage to determine the exact relation of the measured angle to the angular setting of the bridge. The calibrated voltage is obtained from a precision potentiometer which may, by way of example, be of the so-called Kelvin-Varley type. The voltage across the precision potentiometer is set equal to the bridge error voltage corresponding to the entire interval between the bridge positions bracketing the angle to be measured. The position of the wiper of this potentiometer, when the voltage thereof equals the bridge output voltage, indicates the exact position of the measured electrical angle between the two bridge positions.

Our instrument is susceptible to simple, yet precise, calibration procedures. Of major importance is the fact that it can be calibrated even when the angle of the rotating transformer under test is unknown and the shaft of the transformer is inaccessible for adjustment.

While the above description is specifically directed to the measurement of the rotor angle of a synchro, it will be apparent that resolvers or devices having different numbers of secondary windings may be checked with our instruments. The only difference is in the bridge 10 which, in general, will have as many junctions between the resistive arms thereof as there are output leads from the rotating transformer being tested. The taps on the bridge resistors will be arranged according to the variation in resistance required to provide a bridge null at successive discrete intervals of rotation of the rotor of the transformer.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. An instrument for measuring the electrical angle of a rotating transformer such as a synchro or the like having a primary winding and a plurality of secondary windings, said instrument comprising, in combination, a bridge, said bridge having a plurality of input terminals and a plurality of impedance arms, means connecting said secondary windings to said input terminals, a pair of contacts connected to said arms, means for varying the position of at least a first one of said contacts to provide step-by-step variations of the electrical angle of said transformer at which there is a null in the bridge output voltage between said contacts, first indicating means responsive to the position of said first contact, a reference source supplying a reference potential, means other than said rotating transformer for varying the output voltage of said bridge independently of the position of said bridge contacts and means for adjusting the difference between said reference voltage and said bridge output voltage as modified by said voltage varying means, second indicating means responsive to the position of said difference adjusting means, and means for comparing said reference voltage with said bridge output voltage as modified by said voltage varying means.

2. The combination defined in claim 1 in which said reference source includes a potentiometer, said comparing means comparing the difference between the voltage of the movable tap of said potentiometer and said bridge output voltage as modified by said voltage varying means.

3. An instrument for measuring the electrical angle of a rotating transformer such as a synchro or the like having a primary winding and a plurality of secondary windings, said instrument comprising, in combination, a bridge, said bridge having a plurality of input terminals and a plurality of impedance arms, means connecting said secondary windings to said input terminals, a pair of contacts connected to said arms, means for varying the position of at least a first one of said contacts to provide step by step variations of the electrical angle of said transformer corresponding to a null in the bridge output voltage between said contacts, indicating means responsive to the position of said first contact, a reference source comprising a variable potentiometer and means for maintaining across said potentiometer a voltage proportional to the bridge output voltage corresponding to a deviation of an integral number of bridge positions from said electrical angle, and means for comparing the output voltage of said potentiometer with said bridge output voltage, said bridge including attenuating means operable in conjunction with said position-varying means for maintaining constant a bridge output voltage corresponding to a deviation of one position from the null position.

4. The combination defined in claim 3 including means for adjusting the relative phases of said bridge and potentiometer output voltages.

5. The combination defined in claim 3 including means for adjusting the proportion of said bridge output voltage applied to said comparing means.

6. An instrument for measuring the electrical angle of a rotating transformer such as a synchro or the like having a primary winding and a plurality of secondary windings, said instrument comprising, in combination, a bridge, said bridge having input terminals for connection to said secondary windings, a pair of output terminals, said bridge being arranged for the provision of a null voltage at said output terminals for given values of said electrical angle, said bridge including means for varying the null condition among a plurality of positions corresponding to successive values of said electrical angle, there being equal increments between said successive values, first indicating means responsive to the position of said null varying means, a reference source comprising a variable potentiometer having a movable contact and first and second terminals, exciting means for maintaining across said first and second terminals a voltage proportional to the bridge output voltage corresponding to a deviation of an integral number of bridge positions from said electrical angle, second indicating means responsive to the position of said movable contact, and means for comparing the output voltage of said bridge with the output voltage of said potentiometer appearing between said movable contact and said first terminal thereof, said bridge including attenuating means operable in conjunction with said position-varying means for maintaining constant the bridge output voltage corresponding to a deviation of one of said increments from said electrical angle.

7. The combination defined in claim 6 including means for adjusting the ratio of said voltage between said first and second terminals of said potentiometer to said output voltage of said bridge corresponding to said deviation of one increment.

8. An instrument for measuring the electrical angle of a rotating transformer such as a synchro or the like having a primary winding and a plurality of second windings, said instrument comprising, in combination, a bridge, said bridge having input terminals for connection to said secondary windings, a pair of output terminals, said bridge being adapted to provide a null voltage at said output terminals for given values of said electrical angle, said bridge including means for varying the null condition among a plurality of positions corresponding to successive values of said electrical angle, there being equal increments between said successive values, first indicating means responsive to the position of said null varying means, a reference source comprising a variable potentiometer having a movable contact and first and second terminals, exciting means for maintaining across said first and second terminals a voltage proportional to the bridge output voltage corresponding to a deviation of an integral number of bridge positions from said electrical angle, second indicating means responsive to the position of said movable contact, a first resistor connected across said output terminals of said bridge, a plurality of second resistors, switching means for connecting said second resistors in series between said first resistor and one of said bridge output terminals, the values of said second resistors being such as to provide a variable attenuation in the output voltage of said bridge appearing across said first resistor, whereby a given deviation of bridge position from the position corresponding to the electrical angle provides the same bridge output voltage regardless of the value of said electrical angle, and means for comparing the output voltage of said bridge with the output voltage of said potentiometer appearing between said movable contact and said first terminal thereof.

9. The combination defined in claim 8 including a second resistor connected in series with said potentiometer and said exciting means, the ratio of the resistance of said potentiometer to the sum of the resistances of said potentiometer and said second resistor being equal to the ratio of the angular increment between successive positions of said bridge to 90°.

10. An instrument for measuring the electrical angle of a rotating transformer such as a synchro or the like having a primary winding and a plurality of secondary windings, said instrument comprising, in combination, a bridge arranged for connection to said secondary windings, said bridge having first and second output terminals, means for effecting stepwise adjustment of said bridge to provide a null output voltage at said first and second terminals at successive values of said electrical angle separated by equal increments, coarse indicating means responsive to the position of said stepwise adjusting means, a reference source comprising a first variable potentiometer having third and fourth terminals and a movable contact, fine indicating means responsive to the position of said movable contact, and exciting means for applying between said third and fourth terminals a voltage corresponding to a deviation of said electrical angle of an integral number of bridge positions from the bridge position closest to said electrical angle, a second potentiometer having fifth and sixth terminals and a second movable contact, means connecting said sixth terminal to said fourth terminal and said second terminal, a plurality of resistors, switching means for selectively connecting said resistors between said first terminal and said fifth terminal, the values of said second resistors being such as to provide a variable attenuation in the voltage from said bridge appearing across said fifth and sixth terminals, whereby a given deviation of bridge position from the position corresponding to said electrical angle provides the same voltage across said fifth and sixth terminals regardless of the value of said electrical angle, and comparing means connected between said first and second movable contacts for comparing the voltages between said first movable contact and said fourth terminal, and between said second movable contact and said sixth terminal.

11. The combination defined in claim 10 including a second resistor connected in series with said first potentiometer and said exciting means, the ratio of the resistance of said potentiometer to the sum of the resistances of said potentiometer and said first resistor being equal to the ratio of the angular increment between successive positions of said bridge to 90°.

References Cited by the Examiner
UNITED STATES PATENTS

| | | | |
|---|---|---|---|
| 2,625,599 | 1/53 | Downes | 324—158 |
| 2,644,136 | 6/53 | Mullins | 324—101 |
| 2,675,542 | 4/54 | Kress | 324—158 |
| 2,726,382 | 12/55 | Bell | 324—158 |
| 2,811,692 | 10/57 | Ebbs et al. | 324—158 |
| 2,839,726 | 6/58 | Demetriou | 324—158 |
| 3,022,459 | 2/62 | Alper | 324—83 |

WALTER L. CARLSON, *Primary Examiner.*

SAMUEL BERNSTEIN, LLOYD McCOLLUM, FREDERICK M. STRADER, *Examiners.*